(12) United States Patent
Edmond et al.

(10) Patent No.: US 9,357,836 B2
(45) Date of Patent: Jun. 7, 2016

(54) THREAD CLEANING APPARATUS HAVING ADJUSTABLE DIAMETER BRUSH BASES

(71) Applicant: STI, LLC, Mandeville, LA (US)

(72) Inventors: Anthony John Edmond, Mandeville, LA (US); Ryan Harper, Carencro, LA (US); David Stelly, Baton Rouge, LA (US)

(73) Assignee: STI, LLC, Mandeville, LA (US)

( * ) Notice: Subject to any disclaimer, the term of this patent is extended or adjusted under 35 U.S.C. 154(b) by 0 days.

(21) Appl. No.: 14/284,519

(22) Filed: May 22, 2014

(65) Prior Publication Data

US 2015/0335143 A1    Nov. 26, 2015

(51) Int. Cl.

| | | |
|---|---|---|
| *B08B 9/023* | (2006.01) | |
| *B08B 9/027* | (2006.01) | |
| *A46B 13/04* | (2006.01) | |
| *B08B 1/00* | (2006.01) | |
| *B23G 9/00* | (2006.01) | |
| *B08B 1/04* | (2006.01) | |
| *B08B 9/02* | (2006.01) | |
| *E21B 17/00* | (2006.01) | |

(52) U.S. Cl.
CPC .................. *A46B 13/04* (2013.01); *B08B 1/002* (2013.01); *B08B 1/04* (2013.01); *B08B 9/021* (2013.01); *B08B 9/023* (2013.01); *B08B 9/027* (2013.01); *B23G 9/009* (2013.01); *E21B 17/006* (2013.01); *B23G 2200/20* (2013.01)

(58) Field of Classification Search
CPC .......... B08B 9/02; B08B 9/021; B08B 9/023; B08B 9/027; B23G 9/00; B23G 9/009; B23G 2200/20
USPC ........ 15/88, 104.04, 104.05, 104.09, 104.095
See application file for complete search history.

(56) References Cited

U.S. PATENT DOCUMENTS

| | | | | |
|---|---|---|---|---|
| 4,157,096 A | * | 6/1979 | Miller, Jr. ..................... | 134/111 |
| 4,372,003 A | * | 2/1983 | Toelke ............................. | 15/88 |
| 4,433,448 A | * | 2/1984 | True ................................. | 15/88 |
| 4,467,489 A | * | 8/1984 | Begneaud ....................... | 15/88 |

FOREIGN PATENT DOCUMENTS

DE           4037944      *   6/1992

* cited by examiner

*Primary Examiner* — Mark Spisich
(74) *Attorney, Agent, or Firm* — Law Office of Jesse D. Lambert, LLC

(57) ABSTRACT

An apparatus for cleaning of tubular threads having adjustable spacing brushes to accommodate tubulars of different diameters. A plurality of brushes are rotated in a drum, which fits over the tubular connection. The brushes are mounted on L-shaped brackets, which are in turn mounted to a rotary driver by a shaft extending through slots in the brackets. By loosening the attachment of the brackets on the rotary driver, the brackets can be slid radially inward or outward to the extent of the slots, thereby adjusting the diameter of the threads that can be cleaned. The front access plate and seal plate, through which the tubular extends into the drum, are preferably held to the drum by hand operable latches. Solvent may be injected into the drum and onto the threads by a hand pump, and captured in the drum and drained into a container for disposal or reuse.

12 Claims, 4 Drawing Sheets

THREAD CLEANING APPARATUS HAVING ADJUSTABLE DIAMETER BRUSH BASES

CROSS REFERENCE TO RELATED APPLICATIONS

Not applicable.

BACKGROUND

Field of the Invention

This invention relates to apparatus for cleaning of threads on tubular goods.

Tubular goods with threads on either ends are commonly used in many industries. As an example, tubular goods such as drill pipe, tubing, and casing are used in connection with drilling and completion of oil and gas wells in the petroleum industry.

Various compounds, typically a thick paste type product, are frequently applied to the threads on the tubular goods, to serve friction reducing, sealing, and other functions. Certain of such compounds are commonly referred to as "pipe dope." When tubulars, for example drill pipe, are removed from a well, it may be necessary to inspect the threads to ensure that they are suitable for re-use (i.e. no cracks, galling, etc.). It can be appreciated that in order to accomplish a proper inspection it is necessary for the thread surface to be cleaned of pipe dope, surface rust, etc.

At times, such cleaning was done by hand, with a wire brush and various solvents. However, powered devices have been developed to make the thread cleaning process much quicker and do so in an improved manner. Many of such devices comprise a drum-shaped element which fits over the threads. Cleaning surfaces, typically brushes of different forms, are positioned inside the drum and engage the threads. Some form of powered rotary means turns the brushes so that they remove any pipe dope, surface rust, dirt, etc. from the thread surfaces. Preferably, a solvent is sprayed onto the thread surfaces to improve cleaning. Preferably, the solvent, after cleaning the thread surfaces, is captured within the drum and routed via hoses and the like to a container for re-use.

As can be readily appreciated, tubular goods come in a wide range of diameters. It is therefore desirable for the thread cleaning apparatus to have brush holding means which are adjustable over some range of tubular diameters. While multiple thread cleaning tools are still needed to cover a very broad range of tubular diameters, it is still desirable to have a single tool cover as large a tubular diameter range as possible. Although apparatus with adjustable brush carrier diameters have been made, various limitations exist as to known designs.

In summary, the known prior art thread cleaning systems all present various issues, giving rise to a need for an improved thread cleaning apparatus that addresses these issues.

SUMMARY OF THE INVENTION

The thread cleaning apparatus embodying the principles of the present invention comprises a drum which fits over a box or pin tubular thread to be cleaned. Inside the drum are multiple, typically four, brush carriers. Each brush carrier comprises a generally L-shaped member or bracket, having a slot in one leg of the bracket. The brushes are mounted on the other leg of the bracket. The brackets are fixed to the rotating shaft of a rotary driver (which may be a handheld electric drill type driver, hydraulic or pneumatic motor, etc.) by a threaded nut or other similar means. To adjust the radial extent of the brackets, and consequently the spacing between opposing brushes and the size (diameter) of the threads which can be cleaned, the nut is loosened and the brackets slid radially inward or outward in the slots to the desired diameter. The nut is then tightened, fixing the brushes at the desired diameter. Brushes to clean pin threads are fixed to the inboard side of the brackets; brushes to clean box threads are fixed to the outboard side of the brackets. Solvent is pumped to the drum, and therein sprayed onto the threads, by a pump connected to the drum by a hose or tubing. Preferably, the solvent is contained within the drum and is drained out of the drum to a container for re-use or disposal.

DESCRIPTION OF THE PRESENTLY PREFERRED EMBODIMENT(S)

While various designs of tubular thread cleaning apparatus can embody the principles of the present invention, with reference to the drawings some of the presently preferred embodiments can be described.

Figure 1:
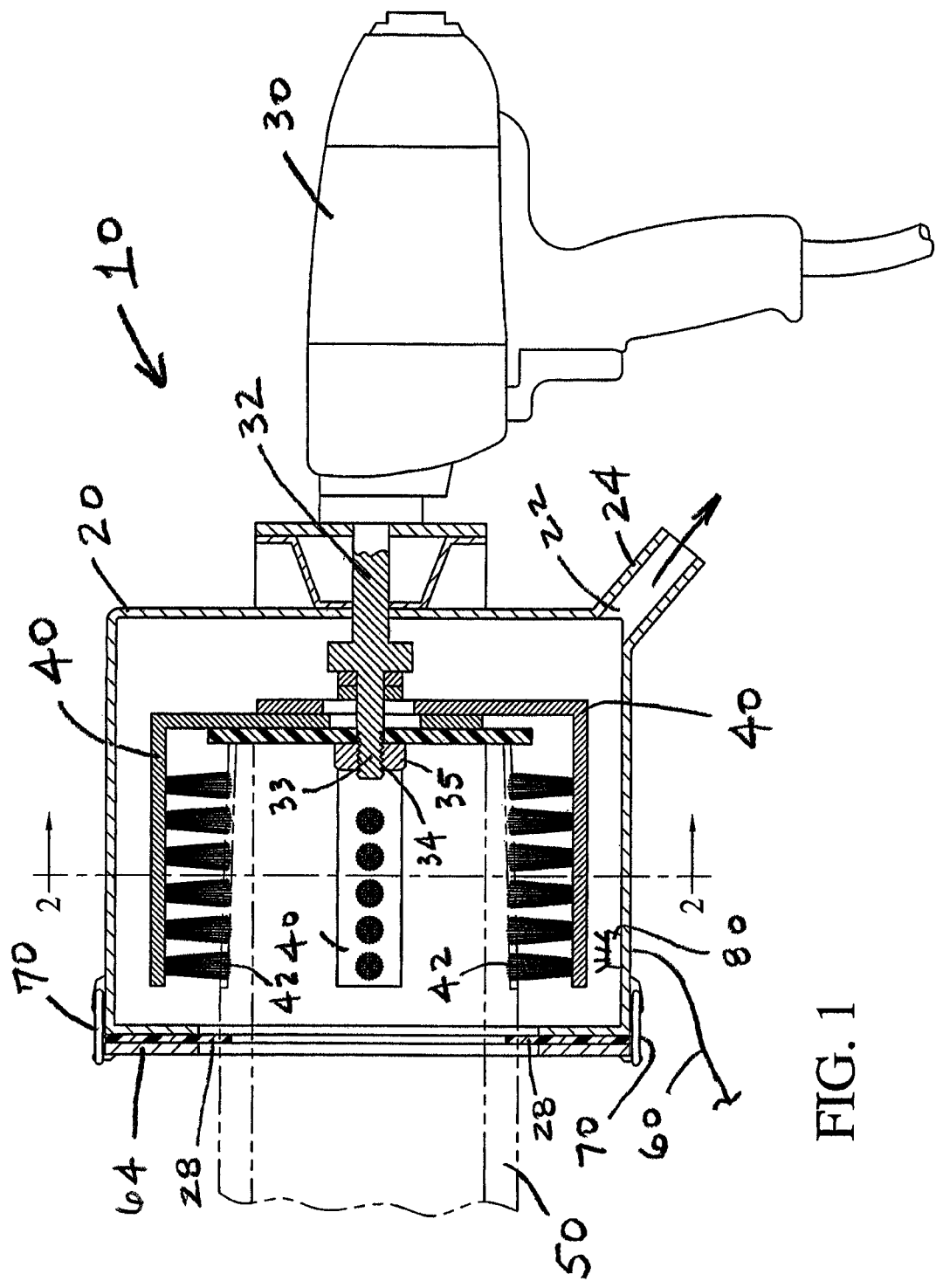
FIG. 1 is a partial cross section view of the thread cleaner embodying the principles of the present invention, on a pin end thread.

FIG. 1 is a side view in partial cross section of the thread cleaning apparatus 10. A drum 20 is attached to rotary driver 30. Rotary driver 30 may be a common hand-held electric motor driven unit, similar to a common electric drill. Alternatively, rotary driver 30 may employ hydraulic or pneumatic motors to generate rotation. Shaft 32 is the rotating member driven by rotary driver. Shaft 32 comprises an extended section 33, over which the brush brackets fit (described below), and the distal end of shaft 32 preferably comprises threads 34, on which nut 35 can be screwed.

Figure 3:
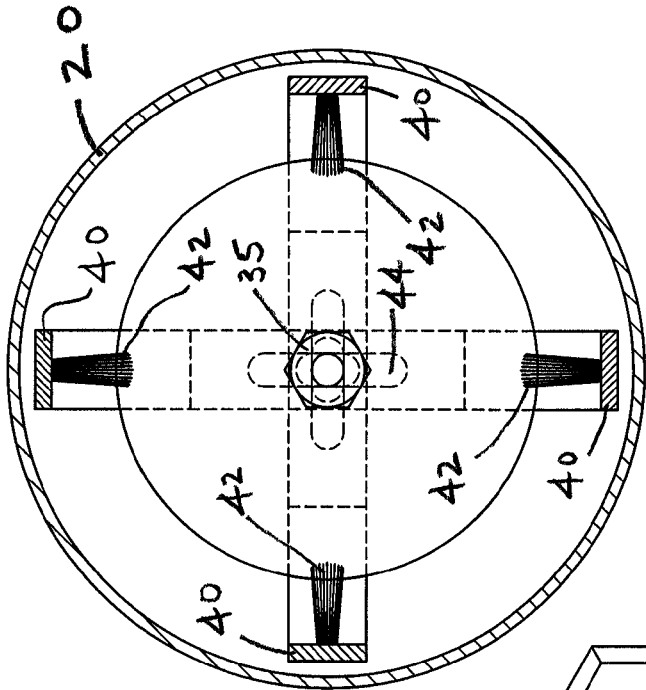
FIGS. 2 and 3 are end views of pin end brushes adjusted for two different thread diameters.
Figure 2:
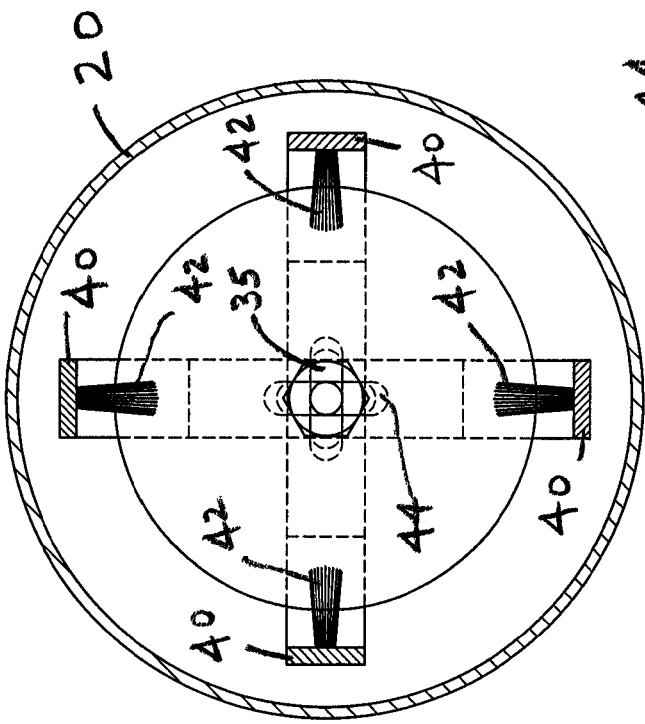
Figure 4:
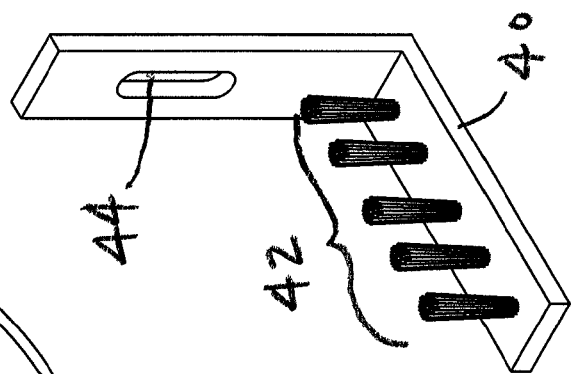
FIG. 4 is a perspective view of a brush mount bracket, for a pin end thread.
Figure 5:
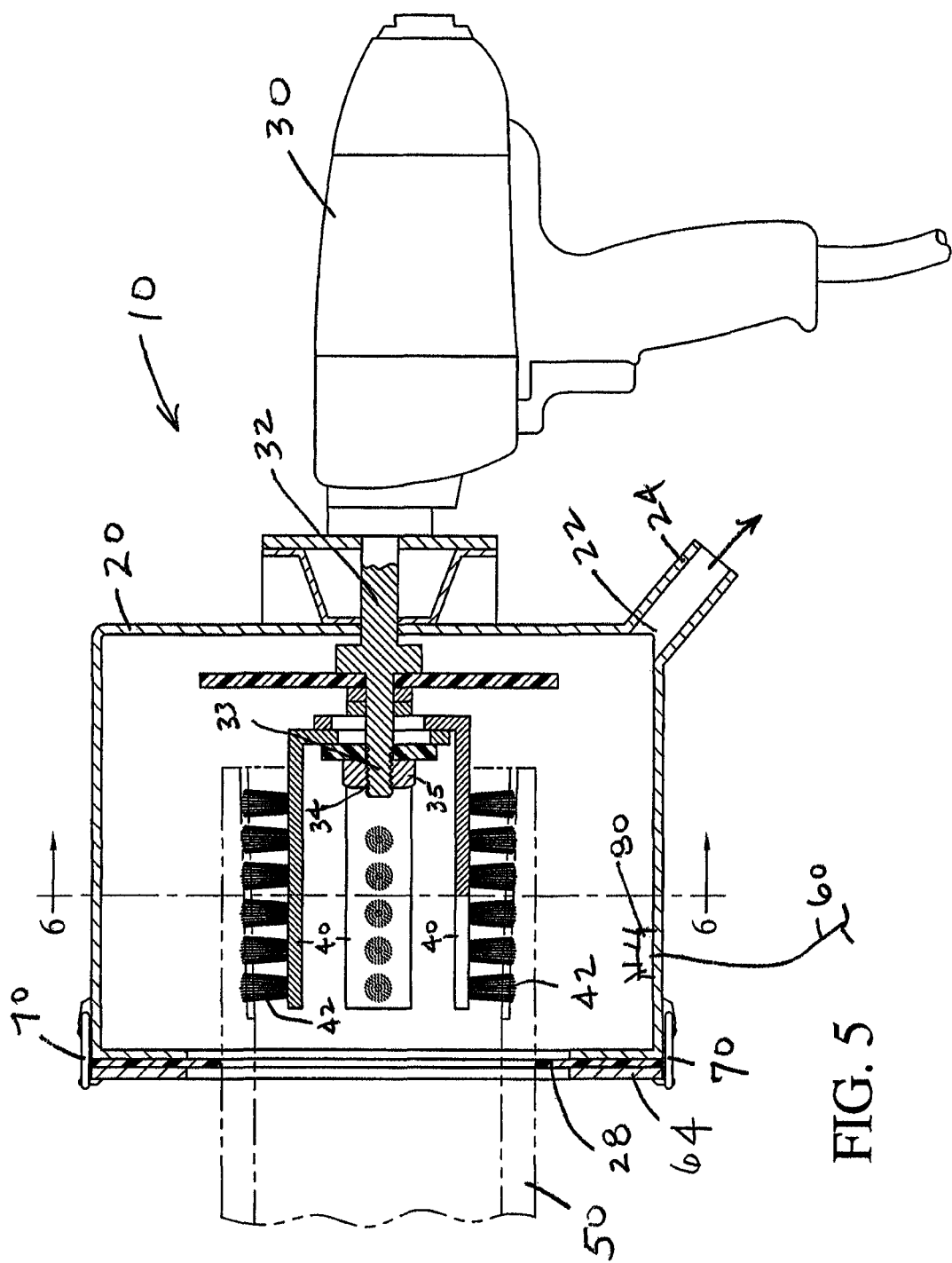
FIG. 5 is a partial cross section view of the thread cleaner embodying the principles of the present invention, on a box end thread.

Referring to FIG. 1, and in more detail to FIGS. 2-4, thread cleaner 10 comprises a plurality of brush brackets 40, on which are mounted brushes 42 which engage the threads of a tubular 50. The embodiment shown in FIGS. 1-4 are for an apparatus to clean pin end (male) threads of a threaded connection. Each bracket 40 is generally L-shaped, with a slot 44 disposed in one leg of the bracket and brushes 42 in the other leg. Preferably, a total of four brackets 40 are provided, providing two pairs of opposing brushes, as can be seen in FIGS. 2 and 3. However, it is understood that only two brackets could be provided if desired, providing only a single pair of opposing brushes.

Thread cleaner 10 is assembled for a desired thread diameter by placing brackets 40 via slots 44 onto shaft 32, adjusting the diameter of brackets 40 and brushes 42 to the desired diameter, then tightening nut 35 on shaft and against brackets 40, thereby holding brackets 40 firmly in place at a desired diameter. FIGS. 2 and 3 show the brackets and brushes adjusted to two different diameters. Thread cleaner 10 can then be used in the manner known in the art for such devices. Thread cleaner 10 is placed over tubular 50 to the position shown in FIG. 1, so that brushes 42 engage the threads. Preferably, a solvent is applied to the threads through a hose 60 which sprays the solvent inside of drum 20. While the operator holds thread cleaner in position on the threads, the operator can engage rotary driver 30 to spin the brushes on the threads, and thereby clean the threads. Preferably, solvent is contained within drum 20 and drains out of drum 20 via outlet 22 and hose 24, to a container, where the solvent is captured for possible re-use.

Figure 7:
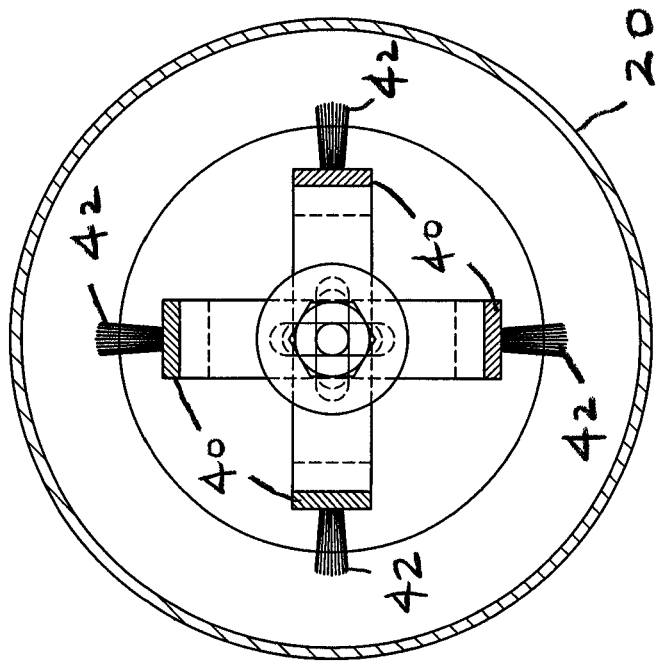
FIGS. 6 and 7 are end views of box end brushes adjusted for two different thread diameters.
Figure 8:
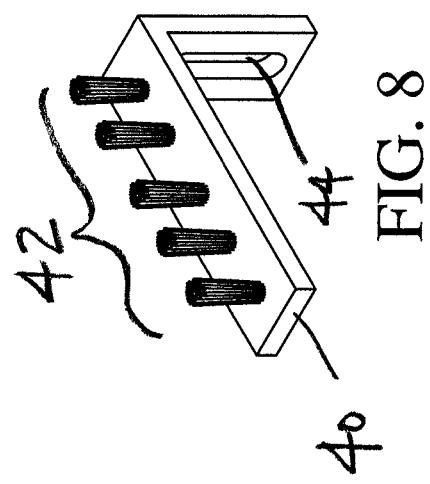
FIG. 8 is a perspective view of a brush mount bracket, for a box end thread.
Figure 6:
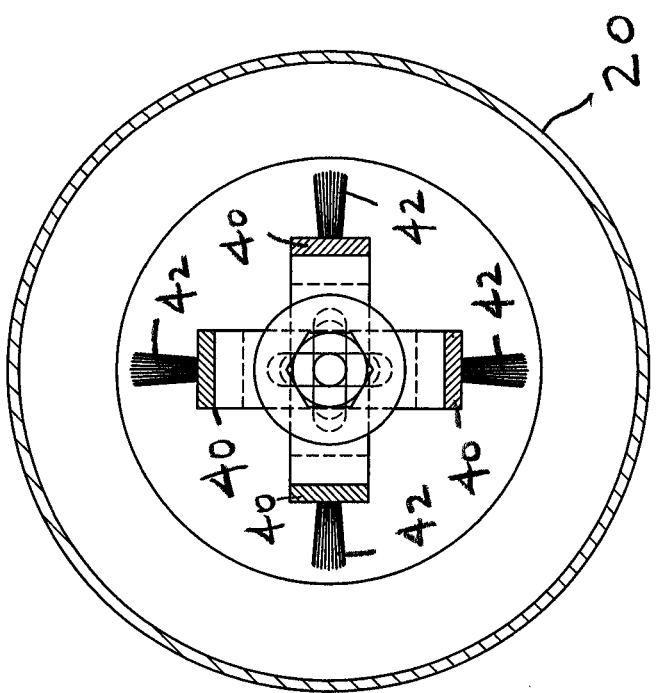

FIGS. 5-8 are views of thread cleaner 10 and component parts, as described, but for use on box end (female) threads. Here, as can be seen in the drawings, especially FIGS. 6-8, brushes 42 are disposed on an outboard side of brackets 40, so as to extend radially outward. This placement puts them into contact with the box end threads, as can be clearly seen in FIG. 5. FIGS. 6 and 7 show the brushes adjusted to two different diameters.

Another aspect of the thread cleaner embodying the principles of the present invention is the manner in which front access plate 64 is fixed to drum 20. Front access plate 64 is preferably held to drum 20 by easily released hand latches 70, rather than being screwed/bolted on, which enables very easy removal of front access plate 64 and access to brackets 40. A seal element 28 seals around tubular 50 and keeps solvent inside drum 20, to be captured in a container, for disposal or possible re-use.

Preferably, solvent is injected into drum 20 through multiple injection ports 80, spaced around the circumference of drum 20. Two or more ports are preferred. Solvent can be carried and injected with a simple hand-carried pump or spray can.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example:
- dimensions of the drum, brackets, and brushes can be varied to suit particular settings
- the number of brackets and brushes can be varied to suit different applications, generally in multiples of 2 (2, 4 as pictured, 6, etc.)
- the rotary driver may be an electric, hydraulic, or pneumatic motor
- solvent may be injected into the drum by any number of injection ports Therefore, the scope of the invention is to be determined not by the illustrative examples set forth above, but by the appended claims and their legal equivalents.

We claim:

1. An apparatus for cleaning threads on tubular goods, comprising:
    a cylindrical drum having an open end;
    a rotary driver attached to the drum and having a rotating shaft extending into the drum;
    two or more L-shaped brackets attached to the shaft and disposed within the drum, each of said brackets comprising a slot in one leg of said bracket, said shaft extending through each said slot, each of said brackets further comprising brushes which engage the threads of a tubular connection when disposed within said drum, said brackets movable radially inwardly and outwardly relative to said shaft in said slots.

2. The apparatus of claim 1, further comprising a front access plate and seal plate disposed over the open end of said drum, said tubular extending through said front access plate and said seal plate into said drum, wherein said front access plate and said seal plate are held to said drum by hand detachable latches.

3. The apparatus of claim 2, further comprising one or more solvent injection ports in said drum, through which solvent can be injected onto said threads.

4. The apparatus of claim 3, further comprising one or more solvent drain ports in said drum, through which solvent can be drained from said drum.

5. The apparatus of claim 1, wherein said rotary driver comprises an electric motor driven driver.

6. The apparatus of claim 1, wherein said brushes extend radially inward for cleaning a pin end connection.

7. The apparatus of claim 1, wherein said brushes extend radially outward for cleaning a box end connection.

8. An apparatus for cleaning threads on tubular goods, said apparatus being adjustable for different diameters of tubulars, comprising:
    a cylindrical drum having a first open end and a rotary driver attached to a second end, said rotary driver having a rotating shaft in operable relationship to said drum;
    two or more L-shaped brackets attached to said rotating shaft and disposed within the drum, each of said brackets comprising two legs and having a slot in one leg, each of said brackets attached to said rotating shaft by an attachment member extending through said slots, said brackets movable radially inwardly and outwardly relative to said shaft via said slots when said attachment member is loosened, each of said brackets further comprising brushes which engage the threads of a tubular connection when said tubular connection is disposed within said drum.

9. The apparatus of claim 8, further comprising a front access plate over said open end, said front access plate having a resilient seal member therein with an opening to seal around a tubular member inserted into said drum, said front access plate secured to said drum by hand operable latches.

10. The apparatus of claim 9, wherein said brushes extend radially inward for cleaning a pin end connection.

11. The apparatus of claim 9, wherein said brushes extend radially outward for cleaning a box end connection.

12. The apparatus of claim 9, wherein said drum further comprises two or more injection ports and a discharge opening whereby fluids within said drum can flow from said drum.

* * * * *